US011179855B2

(12) United States Patent
Dong et al.

(10) Patent No.: US 11,179,855 B2
(45) Date of Patent: Nov. 23, 2021

(54) ACCELERATION COMPENSATION METHOD FOR HUMANOID ROBOT AND APPARATUS AND HUMANOID ROBOT USING THE SAME

(71) Applicant: UBTECH ROBOTICS CORP LTD, Shenzhen (CN)

(72) Inventors: Hao Dong, Shenzhen (CN); Youjun Xiong, Shenzhen (CN); Yuesong Wang, Shenzhen (CN); Mingguo Zhao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 251 days.

(21) Appl. No.: 16/669,551

(22) Filed: Oct. 31, 2019

(65) Prior Publication Data
US 2020/0206944 A1    Jul. 2, 2020

(30) Foreign Application Priority Data

Dec. 30, 2018 (CN) .......................... 201811648996.1

(51) Int. Cl.
*B25J 13/08* (2006.01)
*B25J 9/16* (2006.01)
*B25J 17/02* (2006.01)

(52) U.S. Cl.
CPC ........... *B25J 13/088* (2013.01); *B25J 9/1602* (2013.01); *B25J 13/085* (2013.01); *B25J 17/0283* (2013.01)

(58) Field of Classification Search
CPC ...... B25J 13/088; B25J 9/1602; B25J 13/085; B25J 17/0283; B62D 57/032; G05B 11/42

(Continued)

(56) References Cited

U.S. PATENT DOCUMENTS 7,217,247 B2 * 5/2007 Dariush ................... A61H 1/00
    600/595
7,313,463 B2 * 12/2007 Herr ..................... B62D 57/032
    700/245

(Continued)

FOREIGN PATENT DOCUMENTS

CN    108724195 A    11/2018

OTHER PUBLICATIONS

Y. F. Zheng, "Acceleration compensation for biped robots to reject external disturbances," 1989, IEEE Transactions on Systems, Man, and Cybernetics, vol. 19, No. 1, pp. 74-84, Jan.-Feb. 1989, doi: 10.1109/21.24533 (Year: 1989).*

(Continued)

*Primary Examiner* — Jaime Figueroa

(57) ABSTRACT

The present disclosure provides an acceleration compensation method for a humanoid robot as well as an apparatus and a humanoid robot using the same. The method includes: calculating an angular acceleration of each joint and calculating a six-dimensional acceleration of a centroid of a connecting rod corresponding to the joint in an absolute world coordinate system, if the humanoid robot is in a single leg supporting state; calculating a torque required by the angular acceleration of each joint of the humanoid robot; determining a feedforward current value corresponding to the torque of each joint; and superimposing the feedforward current value on a control signal of each joint to control the humanoid robot. In this manner, the influence of the acceleration can be effectively suppressed, the rigidity of the PID controller of the humanoid robot can be reduced, thereby improving the stability of the entire humanoid robot.

15 Claims, 4 Drawing Sheets

(58) Field of Classification Search
USPC .................................................. 700/245–264
See application file for complete search history.

(56) References Cited

U.S. PATENT DOCUMENTS

| | | | | |
|---|---|---|---|---|
| 7,400,939 | B2* | 7/2008 | Nagasaka | B62D 57/032 318/568.1 |
| 7,650,204 | B2* | 1/2010 | Dariush | B62D 57/032 700/245 |
| 7,949,428 | B2* | 5/2011 | Endo | B25J 9/161 700/245 |
| 8,793,019 | B2* | 7/2014 | Yoshiike | B25J 9/0006 700/253 |
| 8,868,240 | B2* | 10/2014 | Seo | B25J 9/16 700/261 |
| 8,924,015 | B2* | 12/2014 | Hammam | B62D 57/032 700/250 |
| 9,120,227 | B2* | 9/2015 | Zheng | B62D 57/032 |
| 9,412,010 | B2* | 8/2016 | Kawaguchi | G06K 9/00362 |
| 10,080,672 | B2* | 9/2018 | Casler | A61F 2/60 |
| 10,081,098 | B1* | 9/2018 | Nelson | B25J 9/1666 |
| 11,000,945 | B2* | 5/2021 | Asada | B25J 13/02 |
| 2005/0021176 | A1* | 1/2005 | Takenaka | B62D 57/02 700/245 |
| 2007/0016329 | A1* | 1/2007 | Herr | A61F 2/70 700/250 |
| 2008/0281469 | A1* | 11/2008 | Choi | B62D 57/032 700/253 |
| 2010/0114329 | A1* | 5/2010 | Casler | B62D 57/032 623/24 |
| 2011/0066283 | A1* | 3/2011 | Hammam | B62D 57/032 700/250 |
| 2011/0301756 | A1* | 12/2011 | Yoshiike | B62D 57/032 700/253 |
| 2012/0158181 | A1* | 6/2012 | Seo | G05B 15/00 700/261 |
| 2013/0131865 | A1* | 5/2013 | Yamane | B25J 9/1692 700/254 |
| 2015/0051734 | A1* | 2/2015 | Zheng | B25J 9/1633 700/261 |
| 2018/0370021 | A1* | 12/2018 | Asada | B25J 9/0006 |
| 2019/0217464 | A1* | 7/2019 | Xiong | B25J 9/0009 |

OTHER PUBLICATIONS

Zhou et al, "Simultaneous Prevention of Rotational and Translational Slip for a Humanoid Robot", 2018, Applied Sciences 8, No. 9: 1554, pp. 1-15, https://doi.org/10.3390/app8091554 (Year: 2018).*

Zhang et al, A New Method of Desired Gait Synthesis in Biped robot, 2000, IEEE, Proceedings of the 3d World Congress on Intelligent Control and Automation, Jun. 28-Jul. 2, 2000, Hefei, P.R. China, pp. 1300-1304 (Year: 2000).*

* cited by examiner

S110 — Calculate an angular acceleration of each joint based on an angular velocity of the joint and calculating a six-dimensional acceleration of a centroid of a connecting rod corresponding to the joint in an absolute world coordinate system based on the angular velocity of the joint, the angular acceleration, and a Jacobi matrix of the joint with respect to a landing point, if the humanoid robot is in a single leg supporting state S120 — Calculate a torque required by the angular acceleration of each joint of the humanoid robot based on the angular velocity of the joint, the angular acceleration, and the six-dimensional acceleration of the centroid of the connecting rod in the absolute world coordinate system S130 — Determine a feedforward current value corresponding to the torque of each joint based on a preset correspondence S140 — Superimpose the feedforward current value on a control signal of each joint to control the humanoid robot according to the superimposed control signal

FIG. 1

ACCELERATION COMPENSATION METHOD FOR HUMANOID ROBOT AND APPARATUS AND HUMANOID ROBOT USING THE SAME

CROSS REFERENCE TO RELATED APPLICATIONS

This application claims priority to Chinese Patent Application No. 201811648096.1, filed Dec. 30, 2018, which is hereby incorporated by reference herein as if set forth in its entirety.

BACKGROUND

1. Technical Field

The present disclosure relates to humanoid robot technology, and particularly to an acceleration compensation method for a humanoid robot as well as an apparatus and a humanoid robot using the same.

2. Description of Related Art

Walking gait control is a key issue for the movement of humanoid robots, which directly affects the balance ability of humanoid robots. For a typical walking gait control method, it controls each joint of a humanoid robot based on a preset walking trajectory, and then the trajectory of the joint is tracked by a motor driver based on the PID (proportion integration differentiation) algorithm so as to realize the whole walking process. However, the method also has an obvious shortcoming, that is, while the walking speed of the humanoid robot is increased, each joint needs to generate a larger angular acceleration. In this case, the acceleration makes a PID controller difficult to realize the required trajectory tracking through parameter adjustments, which will eventually cause the humanoid robot to have large trajectory tracking errors while moving at high speed, therefore seriously affects the balance of the humanoid robot.

BRIEF DESCRIPTION OF THE DRAWINGS

To describe the technical schemes in the embodiments of the present disclosure more clearly, the following briefly introduces the drawings required for describing the embodiments or the prior art. It should be understood that, the drawings in the following description merely show some embodiments of the present disclosure, hence should not be considered as limitations to the scope of the present disclosure. For those skilled in the art, other drawings can be obtained according to the drawings without creative efforts.

FIG. 1 is a flow chart of an embodiment of an acceleration compensation method for a humanoid robot according to the present disclosure.

DETAILED DESCRIPTION

Figure 2:
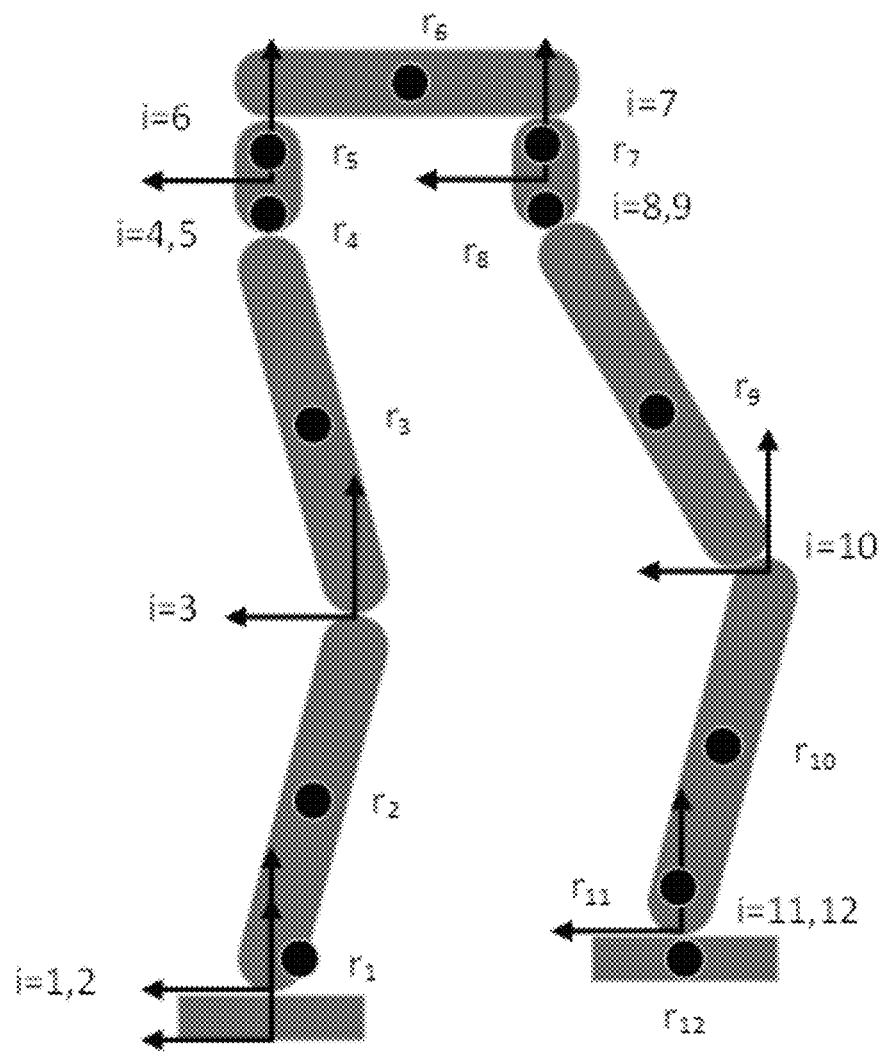
FIG. 2 is a schematic diagram of the structure of joints of a humanoid robot according to an embodiment of the present disclosure.

In the following descriptions, the technical solutions in the embodiments of the present disclosure are clearly and completely described with reference to the drawings in the embodiments of the present disclosure. It is obvious that the described embodiments are only a part of the embodiments of the present disclosure, rather than all embodiments. Generally, the components of the embodiments of the present disclosure which are described and illustrated in the drawings can be disposed and designed in various configurations. Therefore, the following detailed description for the embodiments in the drawings are not intended to limit the scope of the present disclosure, but merely to represent the embodiments of the present disclosure. All other embodiments obtained by those skilled in the an based on the embodiments of the present disclosure without creative efforts are within the scope of the present disclosure.

Example One

FIG. 1 is a flow chart of an embodiment of an acceleration compensation method for a humanoid robot according to the present disclosure. In this embodiment, an acceleration compensation method which is for a humanoid robot having two legs (e.g., a left leg and a right leg) each including joints is provided, where the movements of the humanoid robot are realized by moving the two legs in a staggered manner. The method is a computer-implemented method executable for a processor of the robot, which may be implemented through and applied to an acceleration compensation apparatus shown in FIG. 3 or a humanoid robot shown in FIG. 4, or implemented through a computer readable storage medium. As shown in FIG. 1, the method includes the following steps:

S110: calculating an angular acceleration of each joint based on an angular velocity of the joint and calculating a six-dimensional acceleration of a centroid of a connecting rod corresponding to the joint in an absolute world coordinate system based on the angular velocity of the joint, the angular acceleration, and a Jacobi matrix of the joint with respect to a landing point, if the humanoid robot is in a single leg supporting slate.

In one embodiment, before step S110, the method further includes:

determining whether the humanoid robot is in the single leg supporting stale at a current time.

In which, the step of "determining whether the humanoid robot is in the single leg supporting state at the current time" may include:

obtaining pre-stored gait planning information of the humanoid robot, and determining whether the humanoid robot is in the single leg supporting period at the current time;

obtaining, through a plantar sensor on each leg of the robot, a force perpendicular to a loot surface corresponding to a sole of the leg and determining whether the force perpendicular to the foot surface corresponding to the sole of each leg is greater than a predetermined threshold, if the humanoid robot is in the single leg supporting period at the current time;

determining that the humanoid robot is in the single leg supporting state at the current time, if it determines that there is only the force perpendicular to the foot surface which corresponding to one of the legs is greater than the predetermined threshold; and otherwise, determining that the humanoid robot is not in the single leg supporting state at the current time.

In this embodiment, the gait planning information is pre-set planning information for indicating whether the humanoid robot is in the single leg supporting state or a two legs supporting state, where the gait planning information only indicates the state that the humanoid robot should reach at a certain moment, which does not indicate the slate that the humanoid robot has actually reached.

During the single leg supporting period, the humanoid robot is kept in the single leg supporting state. The single leg supporting period corresponds to time range information which indicates a time range in which the humanoid robot is kept in the single leg supporting state, and the single leg supporting state corresponds to a state corresponding to a current action (i.e., supporting through a single leg) of the humanoid robot.

When the humanoid robot is moved, voltage information is collected through the plantar sensors disposed on the sole of the legs, and the voltage information is converted into a plantar pressure and a pressure center position, that is, the force on the humanoid robot which is perpendicular to the foot surface.

In one embodiment, the plantar sensor may be a pressure sensor or a sensor set composed of a plurality of pressure sensors.

Taking the sensor set composed of a plurality of pressure sensors as an example, the voltage information can be converted into the plantar pressure and the pressure center position through the following equations:

$$F\begin{bmatrix}1\\X\\Y\end{bmatrix} = K\begin{bmatrix}U_{01} - U'_{01}\\U_{02} - U'_{02}\\\ldots\\U_{0p} - U'_{0p}\end{bmatrix}; \text{ and}$$

$$K = \begin{bmatrix}k_{f1} & k_{f2} & \ldots & k_{fp}\\k_{g1} & k_{g2} & \ldots & k_{gp}\\k_{r1} & k_{r2} & \ldots & k_{rp}\end{bmatrix} = \begin{bmatrix}\frac{k_1}{U_iR_f} & \frac{k_2}{U_iR_f} & \ldots & \frac{k_p}{U_iR_f}\\\frac{k_1P_{1x}}{U_iR_f} & \frac{k_2P_{2x}}{U_iR_f} & \ldots & \frac{k_pU_{px}}{U_iR_f}\\\frac{k_1P_{1y}}{U_iR_f} & \frac{k_2P_{2y}}{U_iR_f} & \ldots & \frac{k_pP_{py}}{U_iR_f}\end{bmatrix};$$

where, F is a sum of the pressure on the plantar sensor, X is the abscissa of the pressure center point, Y is the ordinate of the pressure center point, and $U_{om}$ is the collected output voltage of a drive circuit of the p-th pressure sensor, $U'_{op}$ is a bias voltage of the collected output voltage of the driving circuit of the p-th pressure sensor, K is a mapping matrix for converting the voltage collected by the pressure sensors into the pressure on each pressure sensor and its pressure center position, $U_i$ is a reference voltage of the driving circuit of the pressure sensor, $R_f$ is a feedback resistance of the driving circuit of the pressure sensor, $k_p$ is the slope of the characteristic curve of the pressure sensor, $P_{px}$ is the abscissa of the pressure sensor on the sole of the humanoid robot, and $P_{py}$ is the ordinate of the pressure sensor on the sole of the humanoid robot.

In one embodiment, the plantar sensor is a six-dimensional plantar sensor.

The humanoid robot starts timing from its start time. The humanoid robot takes the timing corresponding to the current time as the index condition to traverse the pre-stored gait planning information based on the index condition so as to determine whether the humanoid robot is in the single leg supporting period at the current time.

As an example, the table as follows shows the gait planning information which stored in the humanoid robot in advance.

| Timing (s) | Humanoid Robot State |
|---|---|
| 1~30 | Single leg supporting period |
| 31~35 | Two legs supporting period |
| ... | ... |

During the period from 1 s to 30 s, the humanoid robot is in the single leg supporting period; during the 31 s to 35 s, the humanoid robot is in the two legs supporting period, and so on.

If the humanoid robot is in the single leg supporting period at the current time, it determines whether the force perpendicular to the foot surface which obtained by the plantar sensors of the humanoid robot that corresponds to the two legs is greater than the predetermined threshold. In the case that there is only the force perpendicular to the foot surface that corresponds to one of the legs (the left or the right leg) is greater than the predetermined threshold, while the force perpendicular to the foot surface that corresponds to the other of the legs is less than the predetermined threshold, the humanoid robot is in the single leg supporting state at the current time, and the leg has the force perpendicular to the foot surface that is greater than the predetermined threshold; in the case that the forces perpendicular to the foot surfaces that correspond to both of the legs are both greater than the predetermined threshold, the humanoid robot is not in the single leg supporting state at the current time; and in the case that the forces perpendicular to the foot surfaces that correspond to both of the legs are both less than the predetermined threshold, the humanoid robot is not in the single leg supporting state at the current time.

If the humanoid robot is in the two legs supporting period at the current time, the acceleration of the humanoid robot will not be compensated, hence the above-mentioned humanoid robot acceleration compensation method will not be executed.

FIG. 2 is a schematic diagram of the structure of joints of a humanoid robot according to an embodiment of the present disclosure. As shown in FIG. 2, in the case that the humanoid robot is in the single leg supporting period at the current time, the humanoid robot can be equivalent to a robotic arm with 12 joints which represents that there is a supporting leg (i.e., the single leg) touching the ground, where the robotic arm with 12 joints has 12 degrees of freedom.

In one embodiment, the step of "calculating the angular acceleration of each joint based on the angular velocity of the joint" may include:

multiplying the angular velocity of each joint by a vector of a rotational axis direction of the joint to obtain a three-dimensional angular velocity of the joint; and differentiating the three-dimensional angular velocity of each joint to obtain a three-dimensional angular acceleration.

In this embodiment, each joint of the humanoid robot is further provided with a joint encoding disk for measuring the angular velocity of the joint in real time.

Since the measured angular velocity of the joint is one-dimensional data, the angular velocity of each joint can be multiplied by a vector of the rotational axis direction of the corresponding joint to obtain the corresponding three-dimensional angular velocity. After the angular velocity of the joint is converted into three-dimensional data, the three-dimensional angular velocity of the joint is differentiated to obtain the three-dimensional angular acceleration.

In one embodiment, the three-dimensional angular acceleration of the joint can be obtained by differentiating the three-dimensional angular velocity of the joint through a differential observer.

In one embodiment, the step of "calculating the six-dimensional acceleration of the centroid of the connecting rod corresponding to the joint in the absolute world coordinate system based on the angular velocity of the joint, the angular acceleration, and the Jacobi matrix of the joint with respect to the landing point" includes:

multiplying the three-dimensional angular acceleration of each joint by the Jacobian matrix to obtain a six-dimensional first eigenvector;

multiplying the three-dimensional angular velocity of each joint by a derivative matrix of the Jacobian matrix to obtain a six-dimensional second eigenvector; and adding the first eigenvector and the second eigenvector to obtain the six-dimensional acceleration of the centroid of the connecting rod corresponding to each joint in the absolute world coordinate system.

In one embodiment, the Jacobian matrix can be obtained by an equation of:

$$J_m = [G_1 \ldots G_i];$$

where, $J_m$ is the Jacobian matrix of the m-th joint, $$G_i = \begin{bmatrix} Z_i \times d_i \\ Z_i \end{bmatrix},$$

and $Z_i$ is the vector of the rotational axis direction of the i-th joint, $d_i$ is a distance vector of the i-th joint to the m-th joint, and i is the amount of the joints of the humanoid robot.

After obtaining the Jacobian matrix of each joint with respect to the landing point, the first eigenvector can be calculated through an equation of:

$$A = S_m \times J_m;$$

where, A is the first eigenvector, $S_m$ is the angular acceleration of the m-th joint, and $J_m$ is the Jacobian matrix.

The second eigenvector can be calculated through an equation of:

$$B = T_m \times J'_m;$$

where, B is the second eigenvector, $T_m$ is the angular velocity of the m-th joint, and $J'_m$ is the derivative matrix of the Jacobian matrix $J_m$.

The first eigenvector and the second eigenvector are added to obtain the six-dimensional acceleration of the centroid of the connecting rod in the absolute world coordinate system.

In which, the connecting rod can be regarded as a rigid body for representing the joint of the humanoid robot.

As shown in FIG. 2, the humanoid robot has 12 connecting rods (shown as i=1~i=12) and 12 centroids (shown as $r_1$~$r_{12}$) of the connecting rod. In which, i=1, 2 represents a position including two joints, where one joint i=1 is for moving in the left and right directions while the other joint i=2 is for moving in the front and rear directions; i=3 represents a position including one joint, where the joint can be moved in the left and right directions; i=4, 5 represents a position including two joints, where one joint i=4 is for moving in the left and right directions while the other joint i=5 is for moving in the front and rear directions; i=6 represents a position including one joint, where the joint is vertical to the ground and is for performing rotations; i=7 represents a position including one joint, where the joint is vertical to the ground and is for performing rotations; i=8, 9 represents a position including two joints, where one joint i=8 is for moving in the left and right directions while the other joint j=9 is for moving in the front and rear directions; i=10 represents a position including one joint, where the joint can be moved in the left and right directions; and i=11, 12 represents a position including two joints, where one joint i=11 is for moving in the left and right directions while the other joint i=12 is for moving in the front and rear directions.

Each joint has one centroid. For example, as shown in FIG. 2, the centroid corresponding to the joint i=1 is r1, the centroid corresponding to the joint i=2 is r2, the centroid corresponding to the joint i=3 is r3, and the like.

Each joint is provided with a joint coordinate system. The above-mentioned three-dimensional angular acceleration of the joint and the three-dimensional angular velocity of the joint are both vectors in the joint coordinate system, and the vectors in the joint coordinate system are converted into vectors in the absolute world coordinate system through calculations.

S120: calculating a torque required by the angular acceleration of each joint of the humanoid robot based on the angular velocity of the joint, the angular acceleration, and the six-dimensional acceleration of the centroid of the connecting rod in the absolute world coordinate system.

In this embodiment, the Newton Euler inverse kinematics iterative algorithm is called to sequentially calculate the torque (i.e., the moment) required by the angular acceleration of each joint.

As shown in FIG. 2, the torque required by the angular acceleration of each joint of the humanoid robot can be calculated through the following formula:

$$\tau_A^i = \vec{Z}_i \cdot (\vec{n}_{i,i+1} + \vec{r}_{i-1,i} \times (M_i \vec{M}_i \vec{a}_i - \vec{f}_{i+1,i}) + \vec{r}_{i,i} \times \vec{f}_{i+1,i} + I_i \dot{\omega}_{0j} + \omega_{0j} \times I_i \omega_{0j}), i=1 \ldots 12;$$

where, $\tau_A^i$ is the torque required by the angular acceleration of the i-th joint, $\vec{Z}_i$ is the vector of the rotational axis direction of the i-th joint, $\vec{n}_{i,i+1}$ is the torque vector from the i-th connecting rod to the i+1-th connecting rod, $\vec{r}_{i-1,i}$ is a vector of the centroid of the i-th connecting rod and an origin of a coordinate system of the i−1-th connecting rod, $M_i$ is the mass of the i-th connecting rod, $\vec{a}_i$ is the six-dimensional acceleration of the centroid of the i-th connecting rod in the absolute world coordinate system, $\vec{r}_{i,i}$ is a position vector of the centroid of the i-th connecting rod in its own coordinate system, $\vec{f}_{i+1,i}$ is a torque vector of the i+1-th connecting rod with respect to the i-th connecting rod, $I_i$ is a rotational inertia of the i-th connecting rod, $\dot{\omega}_{0j}$ is the angular acceleration of the i-th joint, and $\omega_{0j}$ is the angular velocity of the i-th joint.

S130: determining a feedforward current value corresponding to the torque of each joint based on a preset correspondence.

In this embodiment, the correspondence between the torque and the feedforward current value can be set in advance, for example, the torque and the feedforward current value can be set to have a proportional relationship (for exanole, the torque=e×the feedforward current value, where e is a conversion factor).

It is also possible to determine the correspondence between the torque and the feedforward current value by fitting the test result of the acceleration compensation when the humanoid robot walks.

After the correspondence is obtained, it is stored in a memory of the humanoid robot.

In addition, the correspondence between the torque and the feedforward current value can also be described through a table as follows.

| Torque | Feedforward current value |
|---|---|
| $\tau^1_A$ | $Q_1$ |
| $\tau^2_A$ | $Q_2$ |
| ... | ... |
| $\tau^i_A$ | $Q_i$ |

In which, if the torque is $\tau^1_A$, its corresponding feedforward current value is $Q_1$; if the torque is $\tau^2_A$, its corresponding feedforward current value is $Q_2$; and if the torque is $\tau^i_A$, its corresponding feedforward current value is $Q_i$.

S140: superimposing the feedforward current value on a control signal of each joint to control the humanoid robot according to the superimposed control signal.

In this embodiment, the humanoid robot drives each joint to move through a joint driver. The joint driver includes a RID controller. A control signal is input to the PID controller to move the joint corresponding to the FID controller according to the control signal.

The feedforward current value obtained in above is superimposed on the control signal input to the PID controller, and the feedforward current value and the control signal input to the PID controller are superimposed to each other to take as a compensation control signal so as to control each joint of the humanoid robot according to the superimposed compensation control signal, thereby achieving the acceleration compensation.

Embodiment Two

Figure 3:
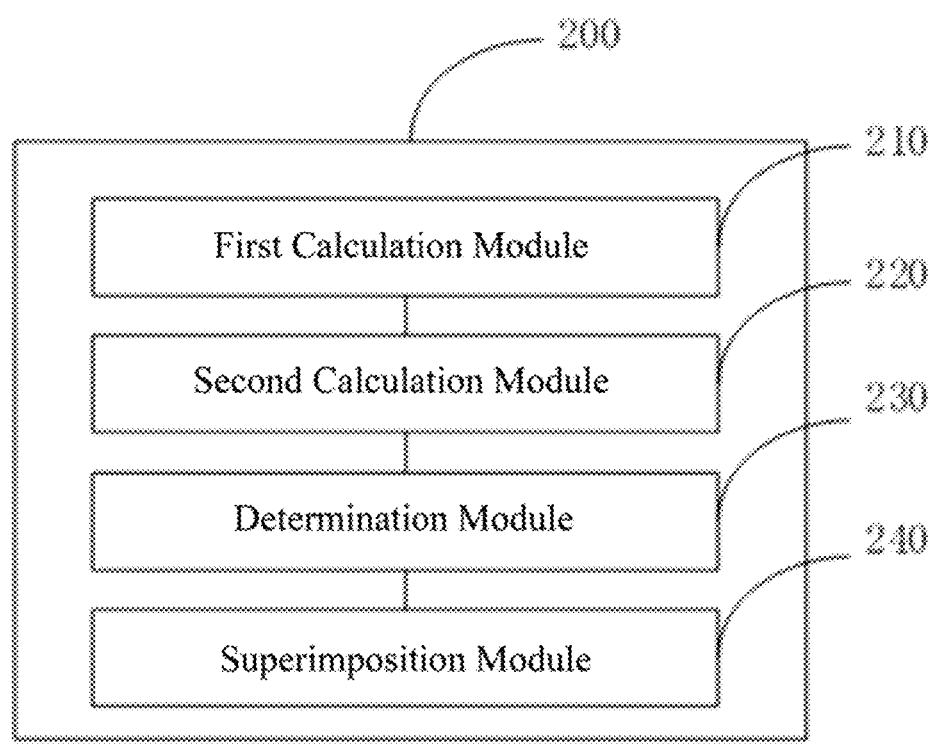
FIG. 3 is a schematic block diagram of an embodiment of an acceleration compensation apparatus according to the present disclosure.

FIG. 3 is a schematic block diagram of an embodiment of an acceleration compensation apparatus according to the present disclosure. In this embodiment, an acceleration compensation apparatus 200 is provided. The acceleration compensation apparatus 200 corresponds to the acceleration compensation method for a humanoid robot in embodiment one, and the acceleration compensation method for a humanoid robot in embodiment one is also applicable to the acceleration compensation apparatus 200, which will not be described herein.

The acceleration compensation apparatus 200 includes a first calculation module 210, a second calculation module 220, a determination module 230, and a superimposition module 240.

The first calculation module 210 is configured to calculate an angular acceleration of each joint based on an angular velocity of the joint and calculating a six-dimensional acceleration of a centroid of a connecting rod corresponding to the joint in an absolute world coordinate system based on the angular velocity of the joint, the angular acceleration, and a Jacobi matrix of the joint with respect to a landing point, in response to the humanoid robot being in a single leg supporting state.

The second calculation module 220 is configured to calculate a torque required by the angular acceleration of each joint of the humanoid robot based on the angular velocity of the joint, the angular acceleration, and the six-dimensional acceleration of the centroid of the connecting rod in the absolute world coordinate system.

The determination module 230 is configured to determine a feedforward current value corresponding to the torque of each joint based on a preset correspondence.

The superimposition module 240 is configured to superimpose the feedforward current value on a control signal of each joint to control the humanoid robot according to the superimposed control signal.

In this embodiment, each of the above-mentioned modules/units is implemented in the form of software, which can be computer program(s) stored in a memory of the acceleration compensation apparatus 200 and executable on a processor of the acceleration compensation apparatus 200. In other embodiments, each of the above-mentioned modules/units may be implemented in the form of hardware (e.g., a circuit of the acceleration compensation apparatus 200 which is coupled to the processor of the acceleration compensation apparatus 200) or a combination of hardware and software (e.g., a circuit with a single chip microcomputer).

Figure 4:
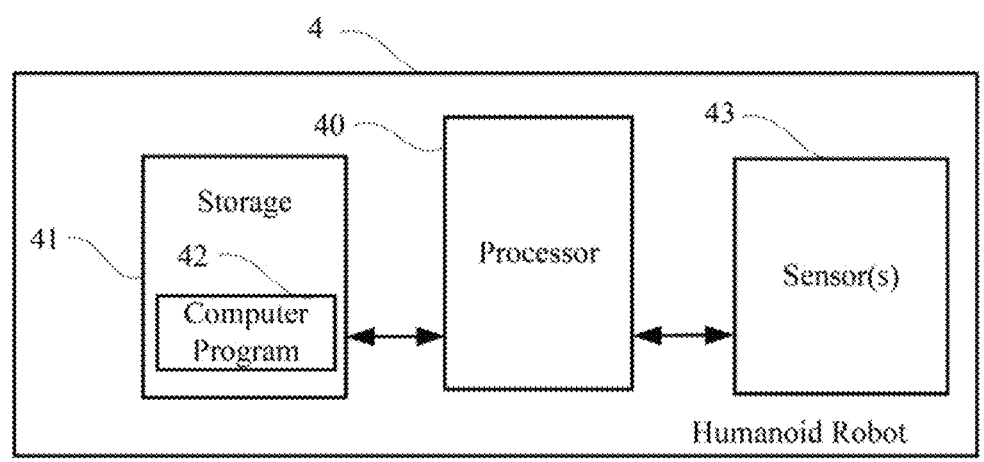
FIG. 4 is a schematic block diagram of an embodiment of a humanoid robot according to the present disclosure.

FIG. 4 is a schematic block diagram of an embodiment of a humanoid robot according to the present disclosure. In this embodiment, a humanoid robot 4 is provided, where the humanoid robot 4 includes two legs each having joint(s). The humanoid robot 4 includes a storage 41, a processor 40, a computer program 42 stored in the storage and executable on the processor 40, and sensor(s) 43 such as plantar sensors and/or other sensors described above. When executing (instructions in) the computer program, the processor implements the steps in the above-mentioned method embodiment one, for example, steps S110-S140 shown in FIG. 1. Alternatively, when the processor executes the (instructions in) computer program 42, the functions of each module/unit in the above-mentioned device embodiments, for example, the functions of the modules 210-240 shown in FIG. 3 are implemented.

The storage 41 may include a program storage area and a data storage area, where the program storage area may store an operating system, an application required by at least one function, and the like; the data storage area may store data created according to the operations of a computing device (e.g., the acceleration compensation apparatus 200), and the like. Furthermore, the storage 41 may include a high speed random access memory (RAM), and may also include a nonvolatile memory such as at least one of a magnetic disk, a flash memory, or other volatile solid state storage device.

In the present disclosure, a computer storage medium is further provided, which is for storing the acceleration compensation method for a humanoid robot which is used in the above-mentioned humanoid robot.

In the present disclosure, the acceleration compensation method for a humanoid robot as well as the apparatus and the humanoid robot using the same are provided. It determines whether the humanoid robot is in the single leg supporting state through the pre-stored gait planning information and the plantar sensor, which makes the determination result to be more accurate by determining two conditions simultaneously. The feedforward current required by the acceleration of each joint is quickly obtained by applying the kinetic model, the feedforward current is directly added to the joint driver, and the feedforward current calculated based on the kinetic model of the joint is superimposed on the joint driver. The algorithm is simple and can realize the trajectory tracking while the acceleration is increased which cannot be realized by merely relying on the PID control algorithm of the joint driver in the premise of not significantly increasing resource consumption, which can effectively reduce the influence of acceleration and reduce the rigidity of the PID controller and the tracking errors, thereby improving the stability of the entire humanoid robot.

It should be understood from the above-mentioned embodiments that, the disclosed apparatus and method may also be implemented in other manners. The above-mentioned apparatus embodiment is merely exemplary. For example, the flow charts and schematic diagrams in the drawings show the architecture, functionality, and operation which are possible to be implemented based on the apparatus, method, and computer program of the above-mentioned embodiments. In which, each block of the flow chart or the block diagram may represent a module, a program segment, or a portion of codes that includes one or more executable instructions for realizing specific logical functions. It should be noted that, in other embodiments, the functions illustrated in the blocks may also be executed in different orders than those shown in the drawings. For example, two consecutive blocks may be executed in parallel, and they may sometimes be executed in a reverse order, which depends upon the functionality involved. It should also be noted that, each block in the block diagram and/or the flow chart and a combination of the blocks in the block diagram and/or the flow chart can be implemented through a dedicated hardware-based system for performing the specific functions or operations, or be implemented through a combination of dedicated hardware and computer instructions.

In addition, all the functional modules or units of each embodiment of the present disclosure may be integrated to form an independent part, or exist separately, or two or more of the modules or units may be integrated to form an independent part.

When the above-mentioned function is implemented in the form of a software functional unit and is sold or used as an independent product, which may be stored in a non-transitory computer-readable storage medium. Based on this understanding, all or a part of the technical solution of the present disclosure which is fundamental or contributes to the prior art or a part of the technical solution may be implemented in the form of a software product stored in a storage medium, which includes instruction(s) used to make a computing device (e.g., a smartphone, a personal computer, a server, or a network device) to perform all or part of the steps of the method described in each embodiment. The above-mentioned storage medium may include a USB flash drive, a portable hard disk, a read-only memory (ROM), a random access memory (RAM), a magnetic disk, an optical disk, or other media capable of storing program codes.

The forgoing is only the specific embodiment of the present disclosure, while the scope of the present disclosure is not limited thereto. For those skilled in the art, various equivalent modifications or replacements can still be easily conceived within the technical scope of the present disclosure, and the modifications or replacements should be included within the scope of the present disclosure.

What is claimed is:

1. A computer-implemented acceleration compensation method for a humanoid robot having two legs each comprising at least a joint, comprising executing on a processor of the humanoid robot steps of:

calculating an angular acceleration of each joint based on an angular velocity of the joint and calculating a six-dimensional acceleration of a centroid of a connecting rod corresponding to the joint in an absolute world coordinate system based on the angular velocity of the joint, the angular acceleration, and a Jacobi matrix of the joint with respect to a landing point, in response to the humanoid robot being in a single leg supporting state;

calculating a torque required by the angular acceleration of each joint of the humanoid robot based on the angular velocity of the joint, the angular acceleration, and the six-dimensional acceleration of the centroid of the connecting rod in the absolute world coordinate system;

determining a feedforward current value corresponding to the torque of each joint based on a preset correspondence; and superimposing the feedforward current value on a control signal of each joint to control the humanoid robot according to the superimposed control signal.

2. The method of claim 1, wherein before the step of calculating the angular acceleration of each joint further comprises:

determining whether the humanoid robot is in the single leg supporting state at a current time.

3. The method of claim 2, wherein the step of determining whether the humanoid robot is in the single leg supporting state at the current time comprises:

obtaining pre-stored gait planning information of the humanoid robot, and determining whether the humanoid robot is in the single leg supporting period at the current time;

obtaining, through a plantar sensor on each leg of the robot, a force perpendicular to a foot surface corresponding to a sole of the leg and determining whether the force perpendicular to the foot surface corresponding to the sole of each leg is greater than a predetermined threshold, in response to the humanoid robot being in the single leg supporting period at the current time; and determining the humanoid robot being in the single leg supporting state at the current time, in response to determining only the force perpendicular to the foot surface which corresponding to one of the legs being greater than the predetermined threshold.

4. The method of claim 1, wherein the step of calculating the angular acceleration of each joint based on the angular velocity of the joint comprises:

multiplying the angular velocity of each joint by a vector of a rotational axis direction of the joint to obtain a three-dimensional angular velocity of the joint; and differentiating the three-dimensional angular velocity of each joint to obtain a three-dimensional angular acceleration.

5. The method of claim 4, wherein the step of calculating the six-dimensional acceleration of the centroid of the connecting rod corresponding to the joint in an absolute world coordinate system based on the angular velocity of the joint, the angular acceleration, and the Jacobi matrix of the joint with respect to the landing point comprises:

multiplying the three-dimensional angular acceleration of each joint by the Jacobian matrix to obtain a six-dimensional first eigenvector;

multiplying the three-dimensional angular velocity of each joint by a derivative matrix of the Jacobian matrix to obtain a six-dimensional second eigenvector; and adding the first eigenvector and the second eigenvector to obtain the six-dimensional acceleration of the centroid of the connecting rod corresponding to each joint in the absolute world coordinate system.

6. The method of claim 1, wherein the Jacobian matrix is obtained by an equation of:

$$J_m = [G_1 \ldots G_i];$$

where, $J_m$ is the Jacobian matrix of the m-th joint, $$G_i = \begin{bmatrix} Z_i \times d_i \\ Z_i \end{bmatrix},$$

and $Z_i$ is the vector of the rotational axis direction of the i-th joint, $d_i$ is a distance vector of the i-th joint to the m-th joint, and i is the amount of the joints of the humanoid robot.

7. The method of claim 1, wherein the torque required by the angular acceleration of each joint of the humanoid robot is Calculated by an equation of:

$$\vec{\tau}_A{}^i = \vec{Z}_j \cdot (\vec{n}_{i/i+1} + \vec{r}_{i-1,i} \times (M_i \vec{a}_i - \vec{r}_{i,i}) + \vec{f}_{i+1,i} \times \vec{r}_{i+1,i} + I_i \dot{\omega}_{0j} + \omega_{0j} \times I_i \omega_{0j}), i=1 \ldots 12;$$

where, $\tau_A{}^i$ is the torque required by the angular acceleration of the i-th joint, $\vec{Z}_j$ is the vector of the rotational axis direction of the i-th joint, $\vec{n}_{i/i+1}$ is the torque vector from the i-th connecting rod to the i+1-th connecting rod, $\vec{r}_{i-1,i}$ is a vector of the centroid of the i-th connecting rod and an origin of a coordinate system of the i−1-th connecting rod, $M_i$ is the mass of the i-th connecting rod, $\vec{a}_i$ is the six-dimensional acceleration of the centroid of the i-th connecting rod in the absolute world coordinate system, $\vec{r}_{i,i}$ is a position vector of the centroid of the i-th connecting rod in its own coordinate system, $\vec{r}_{i,i}$ is a torque vector of the i+1-th connecting rod with respect to the i-th connecting rod, $I_i$ is a rotational inertia of the i-th connecting rod, $\dot{\omega}_{0j}$ is the angular acceleration of the i-th joint, and $\omega_{0i}$ is the angular velocity of the i-th joint.

8. An acceleration compensation apparatus for a humanoid robot having two legs each comprising at least a joint, comprising:

a first calculation module configured to calculate an angular acceleration of each joint based on an angular velocity of the joint and calculating a six-dimensional acceleration of a centroid of a connecting rod corresponding to the joint in an absolute world coordinate system based on the angular velocity of the joint, the angular acceleration, and a Jacobi matrix of the joint with respect to a landing point, in response to the humanoid robot being in a single leg supporting state;

a second calculation module configured to calculate a torque required by the angular acceleration of each joint of the humanoid robot based on the angular velocity of the joint, the angular acceleration, and the six-dimensional acceleration of the centroid of the connecting rod in the absolute world coordinate system;

a determination module configured to determine a feedforward current value corresponding to the torque of each joint based on a preset correspondence; and a superimposition module configured to superimpose the feedforward current value on a control signal of each joint to control the humanoid robot according to the superimposed control signal.

9. A humanoid robot, comprising:
two legs each comprising at least a joint;
a memory;
a processor; and
one or more computer programs stored in the memory and executable on the processor, wherein the one or more computer programs comprise;
instructions for calculating an angular acceleration of each joint based on an angular velocity of the joint and calculating a six-dimensional acceleration of a centroid of a connecting rod corresponding to the joint in an absolute world coordinate system based on the annular velocity of the joint, the angular acceleration, and a Jacobi matrix of the joint with respect to a landing point, in response to the humanoid robot being in a single leg supporting state;
instructions for calculating a torque required by the angular acceleration of each joint of the humanoid robot based on the angular velocity of the joint, the angular acceleration, and the six-dimensional acceleration of the centroid of the connecting rod in the absolute world coordinate system;
instructions for determining a feedforward current value corresponding to the torque of each joint based on a preset correspondence; and
instructions for superimposing the feedforward current value on a control signal of each joint to control the humanoid robot according to the superimposed control signal.

10. The robot of claim 9, wherein the one or more computer programs further comprise:
instructions for determining whether the humanoid robot is in the single leg supporting state at a current time.

11. The robot of claim 10, wherein the instructions for determining whether the humanoid robot is in the single leg supporting state at the current time comprise:
instructions for obtaining pre-stored gait planning information of the humanoid robot, and determining whether the humanoid robot is in the single leg supporting period at the current time;
obtaining, through a plantar sensor on each leg of the robot, a force perpendicular to a foot surface corresponding to a sole of the leg and determining whether the force perpendicular to the foot surface corresponding to the sole of each leg is greater than a predetermined threshold, in response to the humanoid robot being in the single leg supporting period at the current time; and
determining the humanoid robot being in the single leg supporting state at the current time, in response to determining only the force perpendicular to the foot surface which corresponding to one of the legs being greater than the predetermined threshold.

12. The robot of claim 9, wherein the instructions for calculating the angular acceleration of each joint based on the angular velocity of the joint comprise:
instructions for multiplying the angular velocity of each joint by a vector of a rotational axis direction of the joint to obtain a three-dimensional angular velocity of the joint; and
instructions for differentiating the three-dimensional angular velocity of each joint to obtain a three-dimensional angular acceleration.

13. The robot of claim 12, wherein the instructions for calculating the six-dimensional acceleration of the centroid of the connecting rod corresponding to the joint in an absolute world coordinate system based on the angular velocity of the joint, the angular acceleration, and the Jacobi matrix of the joint with respect to the landing point comprise:
   instructions for multiplying the three-dimensional angular acceleration of each joint by the Jacobian matrix to obtain a six-dimensional first eigenvector;
   instructions for multiplying the three-dimensional angular velocity of each joint by a derivative matrix of the Jacobin matrix to obtain a six-dimensional second eigenvector; and
   instructions for adding the first eigenvector and the second eigenvector to obtain the six-dimensional acceleration of the centroid of the connecting rod corresponding to each joint in the absolute world coordinate system.

14. The robot of claim 9, wherein the Jacobian matrix is obtained by an equation of:

$$J_m = [G_1 \ldots G_i];$$

where, $J_m$ is the Jacobian matrix of the m-th joint, $$G_i = \begin{bmatrix} Z_i \times d_i \\ Z_i \end{bmatrix},$$

and $Z_i$ is the vector of the rotational axis direction of the i-th joint, $d_i$ is a distance vector of the i-th joint to the m-th joint, and i is the amount of the joints of the humanoid robot.

15. The robot of claim 9, wherein the torque required by the angular acceleration of each joint of the humanoid robot is calculated by an equation of:

$$\tau_A^i = \vec{Z}_i \cdot (\vec{n}_{i,i+1} + \vec{r}_{i-1,i} \times (M_i \vec{a}_i - \vec{f}_{i,i}) + \vec{f}_{i+1,i} \times \vec{r}_{i+1,i} + I_i \dot{\omega}_{0j} + \omega_{0j} \times I_i \omega_{0j}), i = 1 \ldots 12;$$

where, $\tau_A^i$ is the torque required by the angular acceleration of the i-th joint, $\vec{Z}_i$ is the vector of the rotational axis direction of the i-th joint, $\vec{n}_{i,i+1}$ is the torque vector from the i-th connecting rod to the i+1-th connecting rod, $\vec{r}_{i-1,i}$ is a vector of the centroid of the i-th connecting rod and an origin of a coordinate system of the i−1-th connecting rod, $M_i$ is the mass of the i-th connecting rod, $\vec{a}_i$ is the six-dimensional acceleration of the centroid of the i-th connecting rod in the absolute world coordinate system, $\vec{r}_{i,i}$ is a position vector of the centroid of the i-th connecting rod in its own coordinate system, $\vec{f}_{i+1,i}$ is a torque vector of the i+1-th connecting rod with respect to the i-th connecting rod, $I_i$ is a rotational inertia of the i-th connecting rod, $\dot{\omega}_{0j}$ is the angular acceleration of the i-th joint, and $\omega_{0i}$ is the angular velocity of the i-th joint.

* * * * *